United States Patent [19]
Hunter et al.

[11] 3,768,316
[45] Oct. 30, 1973

[54] FLUERIC DIRECT-IMPACT MODULATOR ACCELEROMETER

[75] Inventors: Joe S. Hunter, Huntsville; Escar L. Bailey, Athens; Little J. Little, Huntsville, all of Ala.

[73] Assignee: The United States of America as represented by the Secretary of the Army, Washington, D.C.

[22] Filed: May 18, 1972

[21] Appl. No.: 254,583

[52] U.S. Cl. .................................................. 73/515
[51] Int. Cl. .......................................... G01p 15/02
[58] Field of Search............... 73/515, 514, 516 LM; 137/81.5

[56] References Cited
UNITED STATES PATENTS
3,515,004   6/1970   Ponterio .............................. 73/515

*Primary Examiner*—James J. Gill
*Attorney*—Harry M. Saragovitz et al.

[57] ABSTRACT

A flueric accelerometer empolying direct-impact fluid modulation for measuring acceleration. The accelerometer includes a housing that defines a fluid impact chamber. Two input tubes having collinear longitudinal axes inject two fluid jets into the impact chamber so that the two jets meet head on and form a radial flow in the impact chamber. Two receiving chambers are provided, one around each input tube, that captures some of the radial flow. Acceleration or deceleration forces will change the momentum flux of either or both of the jets causing the balance point of the radial flow to move; which in turn changes the amount of radial flow captured by the output receivers and thus causes a pressure differential to exist between the two output receivers. Pressures in the output receivers are detected and a signal indicative of the pressure in each receiver is applied as inputs to a fluid servo amplifier. The amplifier has two outputs that are applied to the power jets to increase the momentum of one of the power jets, as required, and bring the radial flow to a balanced position.

1 Claim, 2 Drawing Figures

PATENTED OCT 30 1973　　3,768,316

FLUERIC DIRECT-IMPACT MODULATOR ACCELEROMETER

BACKGROUND OF THE INVENTION

This invention relates in general to fluidic accelerometers and more particularly the invention relates to what is termed a flueric accelerometer, that is one with no moving parts.

Fluidic and flueric components have been of interest, particularly in the missile field, because of their inherent reliability due to the simplicity, ruggedness and lack of sensitivity to environmental conditions such as radiation, temperature, shock and vibration. There are numerous types of fluidic components that are used in various types of control systems, including control systems for missiles, and such systems can be all fluidic or a mix of fluidic and electronic components.

Accelerometers that include gyroscopes are commonly used in missiles and there has been considerable effort and study towards the development of a fluidic accelerometer for use in missiles. Two such fluid accelerometers and their applications are disclosed in U. S. Pat. Nos. 3,201,999 and 3,263,505 assigned to the United States Government. Fluid accelerometers developed previously have generally included at least one moving part and while this is an improvement in simplicity and reliability relative to gyroscopic accelerometers, it is possible to have fluidic accelerometers with no moving parts. There are many fluidic components presently available that have no moving parts and it is desireable to have a flueric accelerometer to use with such components so that the entire fluidic system will have no moving parts.

SUMMARY OF THE INVENTION

An object of the invention is to provide a flueric accelerometer employing a low density fluid medium that makes the accelerometer practical for use in high G environments that are characteristic of missile applications.

Another object is to provide a fluidic accelerometer whose inherent characteristics are such that it can operate in a high radiation environment without any compromise in performance and reliability.

These and other desireable objectives are achieved by the flueric accelerometer described herein. The accelerometer includes a housing that forms the walls of a fluid impact chamber. Two imput tubes having collinear longitudinal axes are each mounted in openings in opposing walls of the housing. The tubes are arranged in an opposed relation and connected to a common source of pressurized fluid, air for example, for injecting two power jets of fluid into the fluid impact chamber so that the two jets meet head on and form a radial flow in the fluid impact chamber. The bore or opening around the power input tube forms a receiver for flow from the fluid impact chamber. Each receiver has a pressure pick off means that is connected to one of two input channels to an operational fluid amplifier. The amplifier has two output channels that provide control flows, one for each input jet, that are supplied to the power input jets to shift theimpact point of the two jets back to a centered and balanced position in the chamber. The pressure differential that exists between the two output channels when the impact point of the two jets is other than balanced is indicative of acceleration forces acting on the accelerometer. The control flow is applied to the power flow as an annular control signal.

DETAILED DESCRIPTION OF THE INVENTION

Figure 1:
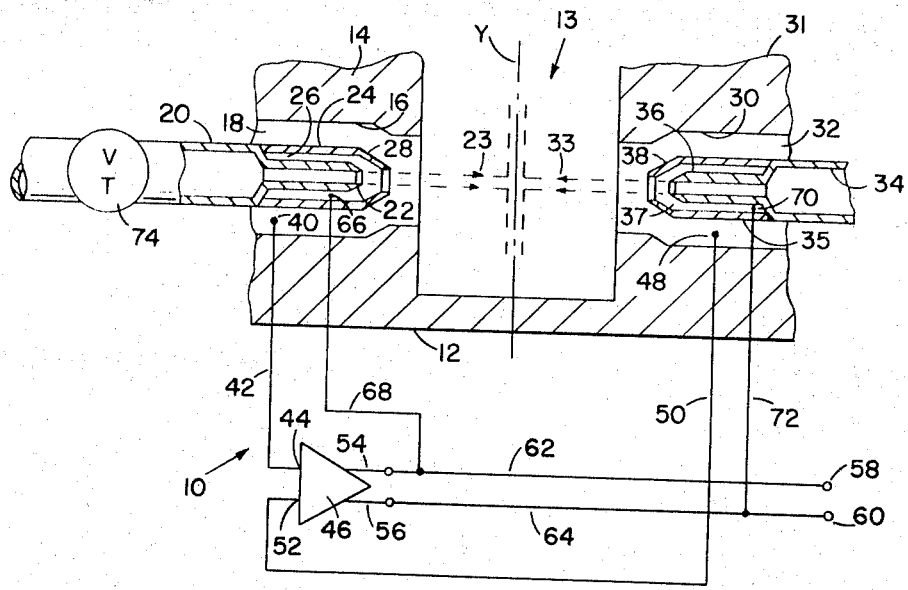
FIG. 1 is a schematic illustration of an accelerometer wherein the control signal is applied to the power input jet as an annular flow that adds to the momentum of the power input flow.

Accelerometer 10 shown in FIG. 1 includes a housing 12 that can be mounted on a missile or other moveable object on which acceleration information is to be taken. The devices disclosed herein use air as the working medium, however accelerometers constructed in accordance with the invention could, with modifications, utilize other fluids as the working meduim. Housing 12 forms a fluid impact chamber 13 and wall 14 of housing 12 has a bore 16 that forms a receiver chamber 18 whose function will be described hereafter. A power input tube 20 mounted in chamber 18 by suitable attachment (not shown) to wall 14 is connected to a suitable source of air under pressure (not shown). Tube 20 includes a converging nozzle section 22 on one end thereof that injects an air jet 23 into chamber 13. The air flow is indicated by arrows in FIG. 1. A casing 24 mounted to tube 20 forms an annular control chamber 26 around nozzle section 22. A converging nozzle section 28 is formed on one end of casing 24 so as to cause any flow from chamber 26 to merge with the flow from nozzle 22.

A second bore 30 in wall 31 of housing 12 forms a second receiver chamber 32. A second power input tube 34 and casing 35, with respective nozzle sections 36 and 38, is mounted in bore 30 and suitably attached (not shown) to wall 31. The two power input tubes are arranged in opposing relation to each other and the longitudinal axes thereof are collinear. Flow of air jet 33 from tube 34 is indicated by arrows in FIG. 1. Casing 35 defines an annular control chamber 37 around power input tube 36.

The accelerometer includes detector means for sensing pressure changes due to acceleration and control means for controlling air jets 23 and 33. Receiving chamber 18 has an opening 40 formed therein for detecting pressure changes. Opening 40 is connected via conduit 42 to input 44 of operational amplifier 46 for applying a signal indicative of the pressure in chamber 18 to amplifier 46. A similar opening 48 in receiver 32 is connected by conduit 50 to input 52 of amplifier 46. Amplifier 46 has two outputs 54 and 56 that are connected to output terminals 58 and 60 by conduits 62 and 64. A pressure differential across outputs 54 and 56 is indicative of the pressure differential between the two receivers. Casing 24 has an injection orifice 66 formed therein through which a control fluid flow is injected into chamber 26. Orifice 66 is connected to and receives its flow from amplifier output 54 via conduit 68. Likewise an orifice 70 in casing 35 is connected to amplifier output 56 by a conduit 72 for providing a control flow to chamber 37.

Figure 2:
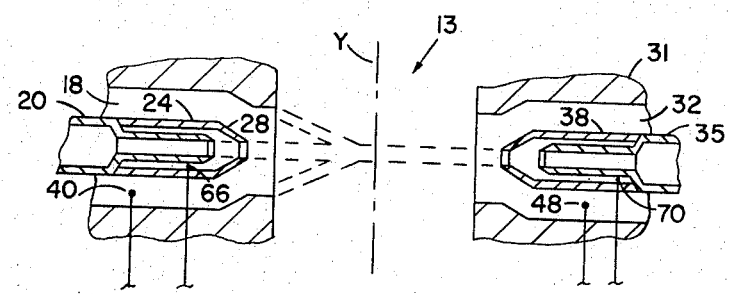
FIG. 2 is a broken away portion of FIG. 1 with arrows showing flow direction when the impact point of the two input power flows has been shifted to the left.

The operation of the accelerometer shown in FIG. 1 will now be described, assuming that the accelerometer has been mounted on some object being accelerated and the air to the input tubes has been regulated so that jets 23 and 33 meet head on in the center of cavity 13 and form a radial flow along the vertical plane indicated in dotted lines and designated by Y. Fluid flow from power input tube 22 can be regulated to achieve a balanced condition of the two jets by means of throttle valve 74. When the accelerometer is accelerated to the right, as viewed in FIG. 1, the momentum of jet 33 is increased while the momentum of jet 23 is decreased. This momentum change causes the impact point of the two jets to shift to the left and the radial flow is altered as shown in FIG. 2. This flow pattern causes increased amounts of fluid to enter receiver 18 and results in an increase in the pressure therein and since less flow enters chamber 32 the pressure therein is reduced. These changed pressure conditions are communicated through conduits 42 and 50 to amplifier 46 as input signals where they are summed and amplified and delivered as output flows. The output flows are applied as control flows to control chambers 26 and 37 and to output terminals 58 and 60 where a pressure differential will be present across the two terminals anytime the radial flow in chamber 13 is not balanced. This pressure differential could be monitored if desired by a suitable instrument. When there is an increased input signal in input 44, the signal at output terminal 54 will increase thus increasing the air flow to orifice 66 and chamber 26. This will result in increased annular flow from nozzle 28 that impinges on air jet 23 to cause a decrease in the diameter of the jet and an increase in the momentum flux of the air jet. This causes the impact point of the two air jets to move back towards a balanced condition in the middle of the fluid impact chamber. In this balanced condition the pressure in the two output receiving chambers is the same, however any change in acceleration forces will cause an unbalanced condition of the radial flow which would then be sensed and corrected in the manner discussed above.

We claim:

1. A fluidic accelerometer for measuring acceleration along an axis of the accelerometer comprising:
   a housing that defines a fluid impact chamber,
   a pair of power jet tubes for directing two power jet fluid flows into said fluid impact chamber, said power jet tubes being mounted in said housing in an opposing position so that the longitudinal axes of the tubes coincide and the power jet tubes discharge toward one another so that the fluid flows therefrom meet head on in the fluid impact chamber and form a radial flow cone that tends to move relative to said housing as said accelerometer is subjected to acceleration and deceleration forces,
   a common source of fluid pressure connected to said power jet tubes for supplying fluid thereto,
   detector means for detecting the position of said radial flow cone in said fluid impact chamber and providing a signal that is indicative of the position of said radial flow cone, said detector means including two receiving chambers formed in said housing that are in fluid communication with said fluid impact chamber, said two receiving chambers being positioned so that a receiving chamber is arranged around each power jet tube whereby movement of the radial flow cone in the fluid impact chamber will cause a pressure differential between the two receiving chambers,
   control means that receives a signal from said detector means and develops a control signal for modulating the power jet fluid flow so as to maintain the radial flow cone centered in said fluid impact chamber,
   means for transmitting fluid signals indicative of fluid conditions in said receiving chambers from said receiving chambers to said control means,
   said control means including a fluidic amplifier means that receives as inputs the signals from the receiving chambers and delivers an output signal in response thereto in the form of two control fluid flows,
   a control flow tube mounted around each power jet tube to form two control cavities, one control cavity around each power jet tube, said control cavities each having a discharge opening through which the power jet fluid flow passes when injected into the fluid impact chamber, and
   passageway means for applying one of the two control fluid flows from the fluid amplifier means to one of the control cavities and the other control fluid flow to the other control cavity, whereby a control fluid flow can be applied to either of the two control cavities and this flow applied to the power jet flow to increase the momentum thereof as needed to maintain the radial flow cone in the center of the fluid impact chamber.

* * * * *